Aug. 21, 1962 D. I. BOHN 3,050,601
TEMPERATURE CONTROL SYSTEM
Filed Nov. 14, 1958 3 Sheets-Sheet 1
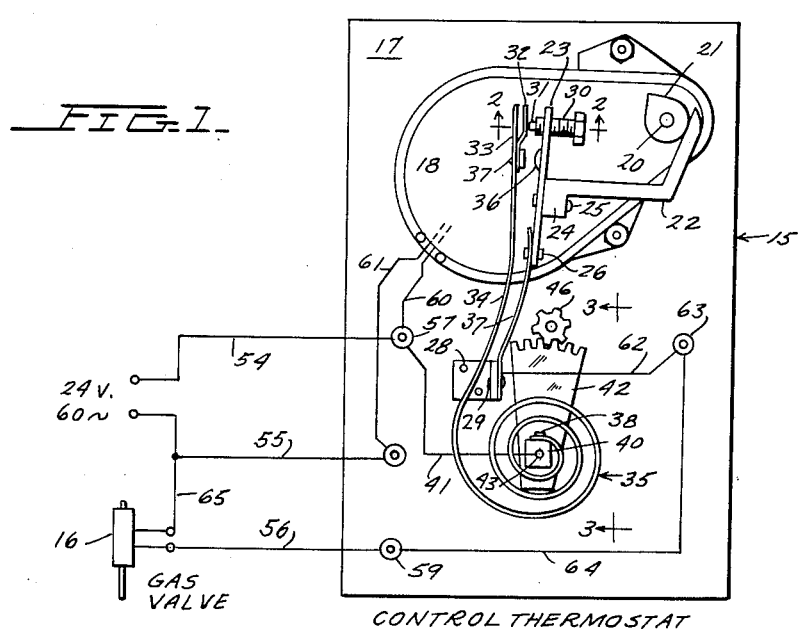
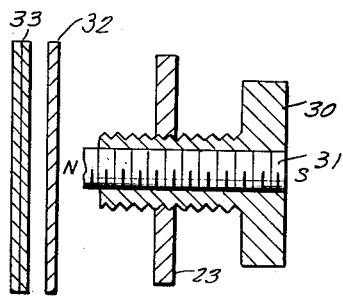
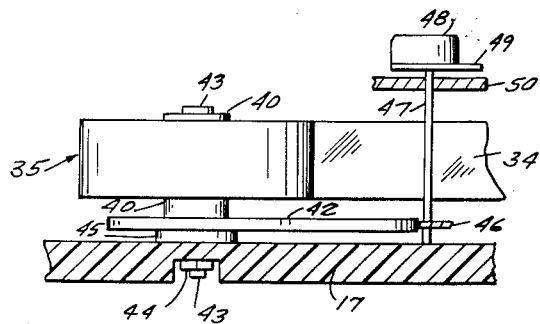
INVENTOR.
DONALD I. BOHN
BY
ATTORNEYS

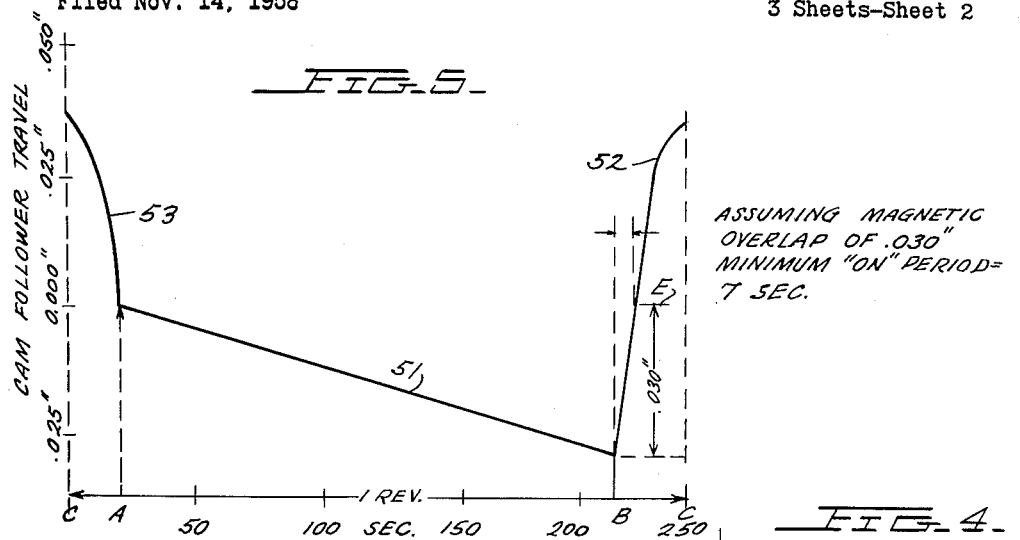
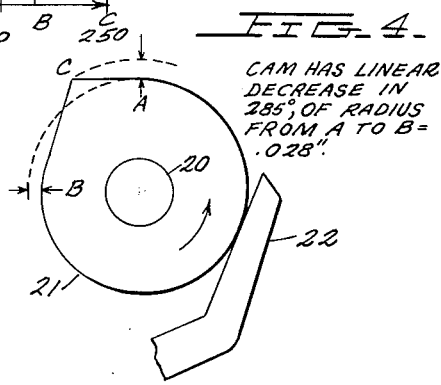
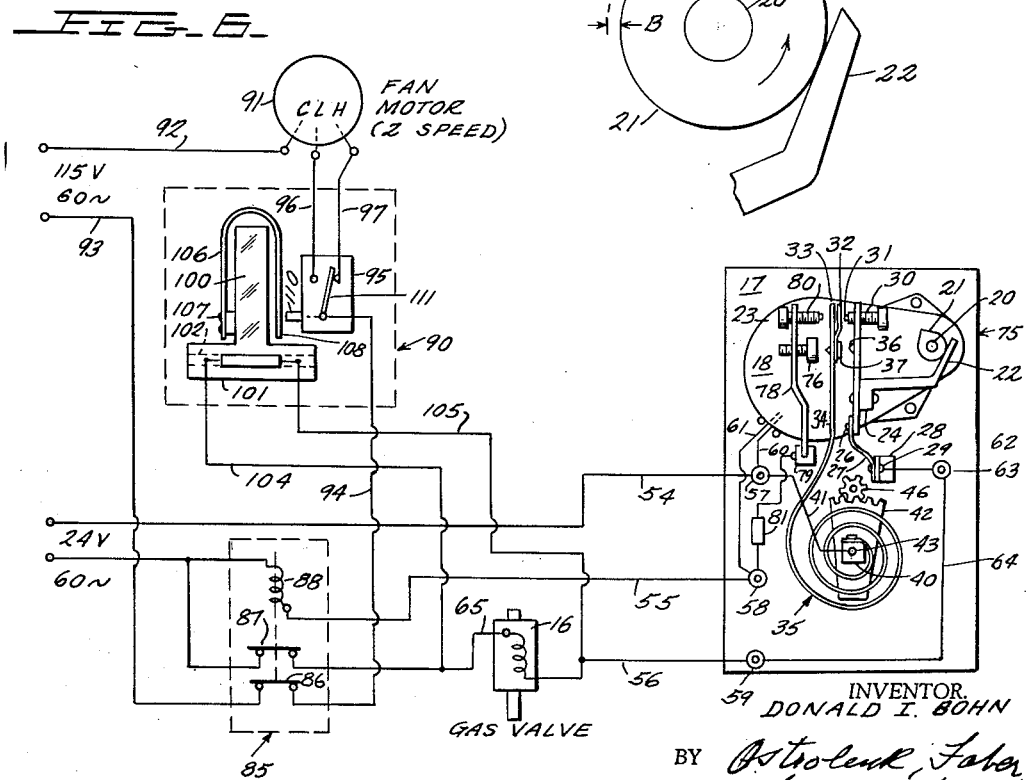

Aug. 21, 1962 D. I. BOHN 3,050,601
TEMPERATURE CONTROL SYSTEM
Filed Nov. 14, 1958 3 Sheets-Sheet 3

INVENTOR.
DONALD I. BOHN

BY Ostrolenk, Faber,
Gerb & Soffen
ATTORNEYS

United States Patent Office 3,050,601
Patented Aug. 21, 1962

---

3,050,601
TEMPERATURE CONTROL SYSTEM
Donald I. Bohn, 377 Country Club Road, Asheville, N.C.
Filed Nov. 14, 1958, Ser. No. 773,942
4 Claims. (Cl. 200—136.3)

This invention relates to temperature control systems, and more particularly relates to novel interior thermostat control units, and heating and/or cooling systems controlled therewith.

The thermostat control units hereof comprise a bimetallic thermal strip which actuates a switch in accordance with ambient temperature conditions. My invention units function on a predetermined cyclic basis, variably modulated in accordance with temperature difference, generally in the manner of my Patent No. 2,571,822, issued October 16, 1951. The control units of the present invention eliminate bellows, are simpler, lower in cost, have wider application and provide more effective and efficient control than the aforesaid patent controls or comparable prior art devices. The invention control system is applicable to most forms of heating systems, as well as to the cooling and air conditioning fields, as will be set forth hereinafter.

In accordance with my invention, the heat supply may be considered as continuously applied cyclically at a predetermined frequency. The cyclical application is, however, variably modulated in accordance with the temperature difference between the indicated desired temperature and the existing temperature, the modulation consisting in cutting the heat supply off or on by variable amounts in accordance with this temperature difference.

Thus, assuming by way of illustration a heat cycle of four minutes, and the room temperature below the desired temperature, in accordance with my invention the temperature control functions to supply continuous heat until the room temperature approaches to within a predetermined value of the desired temperature, which again by way of illustration may be within 2° of the desired temperature. From this point on, the control automatically functions to modulate the four minute cycle; that is, I cut off the heat in each such four minute cycle by a varying amount in accordance with the above mentioned temperature difference, the off time period being smaller when the temperature difference is great and the off period being greater as the temperature difference becomes smaller; or looking at this from a heat supply point of view in each four minute cycle the on period is longer when the above indicated temperature difference is great and the on period is relatively less when the indicated temperature difference is smaller.

At some points in such a modulated system, the heat losses equal the heat supply and a state of equilibrium is achieved in this dynamic system and this condition is maintained so long as this balance maintains. While this state of equilibrium obtains, the on and off time of the heat supply remains constant. I have in practice found that I can secure such a state of stability or balance at any point within a range of 1° and I can reduce this temperature range by either decreasing the period of the cycle, i.e., increasing the frequency of the cycle.

Energy available from a thermal strip of reasonable size and cost is much less than that from gas filled bellows. Also the strip has greater flexibility at the contact region than the bellows. Novel means and cam arrangements are provided by my present invention to overcome magnetic overlap due to these inherent thermal strip characteristics. The control thermostat unit hereof is made to respond to heating periods as short as even seven seconds out of a 240 second cycle. In a further form of the invention a settable magnetic back contact is used to provide greater control flexibility. Also novel relay arrangements are used in conjunction therewith for dual speed control.

To more clearly set forth the differences and advantages of my invention as compared to conventional bimetallic strip thermostat controls, the following comparisons are made. The conventional units comprised
 (a) A bimetallic thermal strip.
 (b) A manual temperature adjustment.
 (c) A magnetic or mercury snap action switch with circuit contacts.
 (d) A resistor in series with the contact circuit adjacent to the thermal strip, to shorten the "on" period. Because of the resistor (d) the "on" period becomes very nearly constant, the opening of the contacts (c) being almost independent of any temperature rise in the room. Tests show that in most cases, this preheat resistor (d) causes the contacts (c) to open before any heat reaches the thermostat from the furnace for the "on" period in question.

Assume the above conventional thermostat has an "on" period of 4 minutes, this being essentially constant. The following table results:

| Outside temp. | Percent heat demand | Minutes "on" | Minutes "off" | Minutes cycle |
|---|---|---|---|---|
| Very cold | 95 | 4 | .2 | 4.2 |
| Cold | 70 | 4 | 1.7 | 5.7 |
| Moderate | 50 | 4 | 4 | 8.0 |
| Mild | 30 | 4 | 9.3 | 13.3 |
| Very mild | 5 | 4 | 76.0 | 80.0 |

This table shows why this type of thermostat does a good job in cold weather, since full heat "on" for 4 minutes will not raise the room temperature except a fraction of a degree.

In mild weather, such as occurs day after day in the afternoon in spring and fall, this 4 minute "on" period causes a rise in room temperature of several degrees, with accompanying discomfort.

As described hereinabove, my invention system effects regular cyclic control action, e.g. each 4 minutes. Under similar demand conditions, per above, this results in the following table of operation:

| Outside temp. | Percent heat demand | Minutes "on" | Minutes "off" | Minutes cycle |
|---|---|---|---|---|
| Very cold | 95 | 3.8 | .2 | 4.0 |
| Cold | 70 | 2.8 | 1.2 | 4.0 |
| Moderate | 50 | 2.0 | 2.0 | 4.0 |
| Mild | 30 | 1.2 | 2.8 | 4.0 |
| Very mild | 5 | .2 | 3.8 | 4.0 |

My invention cyclic control thus provides more realistic and effective temperature results in operation.

Further, the heater on the conventional thermostat provides an artificial ambient well above average room temperature. Since this heater is "on" when the thermostat is "on," the effect of this heater in causing a calibration error is proportional to the percent "on" period. Tests show that if the thermostat is correctly calibrated for very cold weather, the average room temperature will be from 2° to 4° higher in mild weather. To this error, there should be added the cyclic variation of 2° or more. A change during the night from, say 30° F. to 65° F. the next afternoon, would give a total variation of 3° or 4° on a recording thermometer.

For particular heating systems, as forced hot air with oil burner, or with another fuel source and a plurality of registers, my herein invention is particularly applicable. As will be described in detail hereinafter, my thermostat control system may effectively be used for simultaneous control of a number of registers for such systems. Also, in a specific form of the present invention novel individual register controls are provided as will be set forth hereinafter.

It is accordingly a primary object of my present invention to provide a novel interior thermostat control unit, and system therewith.

Another object of my present invention is to provide a novel thermostat control system for interior heating, cooling or air conditioning.

A further object of my present invention is to provide a novel thermostatic control system effective for most conventional heating and cooling arrangements.

Still another object of my present invention is to provide a novel thermostatic control unit with a spiral bimetallic thermal element effecting direct contact action.

Still a further object of my present invention is to provide a novel thermostatic control system for forced hot air installations and novel registers therefor.

These and other objects of my invention will become more apparent from the following description of exemplary embodiments thereof illustrated in the drawings, in which:

FIGURE 1 is a plan view of one form of my control thermostat in circuit with a valve.

FIGURE 2 is an enlarged cross-sectional view of the adjustment screw section, taken along the line 2—2 of FIGURE 1.

FIGURE 3 is an enlarged view of the thermal element as seen along the line 3—3 of FIGURE 1.

FIGURE 4 is an enlarged view of the cyclic cam section of the unit of FIGURE 1, illustrating its development.

FIGURE 5 is a graph of the cyclic action of the control cam of FIGURE 4.

FIGURE 6 illustrates a modified form of my control thermostat, in circuit with a heating control system of more flexible control than FIGURE 1.

Figure 7:
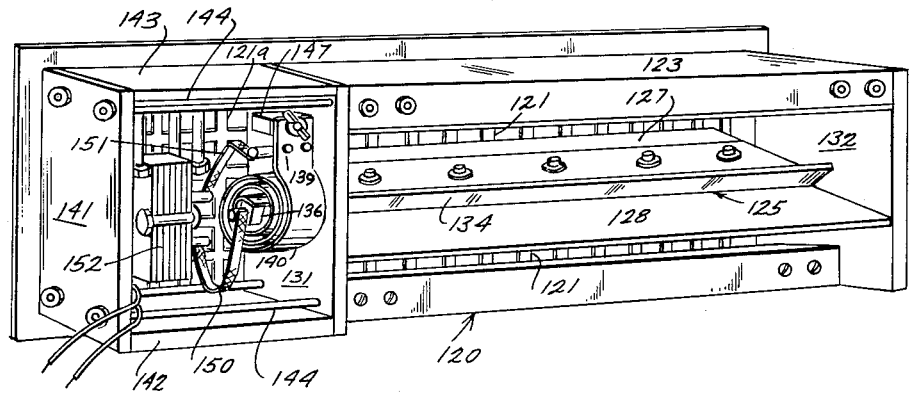
FIGURE 7 is a perspective illustration of an exemplary register control for zone hot air systems.

FIGURE 1 shows an exemplary control thermostat 15 in circuit with an electromagnetic gas valve 16 for a "Single Control Forced Hot Air System." Thermostat 15 comprises a non-metallic base 17 on which is mounted a small A.C. timing motor 18. The output shaft 20 of motor 18 is driven at a predetermined rate e.g. one revolution each 4 minutes. It is understood that motor 18 may be proportioned to provide a different cyclic speed to shaft 20 as required in its application. For forced hot air, controlled from a single location, a motor shaft (20) speed of approximately 1 revolution in 4 or 5 minutes has been found excellent in the invention system.

A cam 21 of particular shape is affixed to shaft 20, and rotates therewith. A specific exemplary shape and design for cam 21 is set forth hereinafter in connection with FIGURES 4 and 5. A non-metallic cam follower 22 is fastened to a non-magnetic metal plate 23, e.g. of aluminum, through base 24 and fastening means 25.

Plate 23 is flexibly supported with respect to base 17 through a strip of thin spring material 27 secured to an end of plate 23 by rivets 26. The spring strip 27 is attached to a post 28 on base 17 through fastening means 29. Spring strip 27 is biased to keep cam follower 22 continuously against cam 21.

At the free end of non-magnetic plate 23 is a non-magnetic screw 30, e.g. of aluminum or brass having a small cylindrical permanent magnet 31 centrally therein. FIGURE 2 is an enlarged cross-sectional view through magnet assembly 30 threaded in plate 23. The magnet 31 is pressed longitudinally into screw 30, and coacts with a thin strip of steel 32 extending from the tip 33 of bimetallic thermal member 35. A button 36 of suitable contact material is fastened to plate 23 for electrical coaction with contact 37 near tip 33. The magnetic tip 31 in conjunction with strip 32 provides a desirable snap action of make and break for contacts 36, 37.

A single strip of bimetallic thermal material is used as the thermal member 35, basically in the form of a spiral with its central end 38 fastened to a pivoted post 40, and its outer arm 34 extending to magnetic member 30 and contact 36 with tip 33. The thermal control circuit extends through spiral bimetallic member 35 across contact 37 to contact 36, and through lead 41 connected to end 38 at post 40. Thermal strip 35 is so assembled that a rise in ambient temperature will cause contact 37 to move away from contact 36. The exemplary unit 15 used a thermal member 35 with .040" x ¾" bimetallic strip, having the outer diameter of the spiral 1½" and arm 34, 3" long; other dimensions of course being feasible.

A suitable bimetallic material is "Poliflex" sold by the H. A. Wilson Company of Union, New Jersey.

Thermal member 35 is supported on central post 40 that in turn is affixed to a sector gear 42, see FIGURES 1 and 3. Sector gear 42, in turn is pivotally mounted on base 17 through bolt 43 and nut 44, and spacer 45. A pinion 46 engages sector gear 42. Pinion 46 is rotatably supported by rod 47, suitably in unit 15. A knob 48 attached to rod 47, exterior of top panel 50, is used to control the setting of pinion 46 and in turn that of sector gear 42 and the angular setting of thermal member 35 therewith. The control unit 15 is thereby manually set for any desired temperature, through knob 48 with a pointer 49 related to a scale on cover 50 (not shown).

In one form of the invention, synchronous clock motor 18 operates continuously and rotates cam 21 at a speed of one revolution in four minutes. This speed of rotation is a compromise between selecting a rate of rotation which is much faster to provide more accurate temperature control than is necessary and which would cause an undesirably large number of operations in a day, and too slow a period of rotation which would actually permit an appreciable temperature variation to exist during the period of one rotation. This speed of cam rotation, therefore, may be selected to suit various conditions. It has been found by trial that one revolution in four minutes is quite satisfactory for a normal house, both from a standpoint of providing perfect control and yet not causing an excessively high number of gas valve operations in a certain period of time.

The timing cam 21 has a different shape and design theory than the heart-shaped cam of Patent No. 2,571,822. In view of the magnetic overlap due to member 30, 31 a constant rate of rise and fall by the cam would result in minimum "on" periods of 40 or even 50 seconds, much too long. The shape of cam 21 is detailed in enlarged FIGURE 4, and its action developed in FIGURE 5. In the exemplary control unit 15 there is a linear decrease between points A and B, 285° apart on the cam, of 0.028"; and a rise from B to tip C of 0.064" in 45° of the cycle. The decrease from tip C to A, in 30°, is 0.036". As seen in FIGURE 5, with point A as the travel reference, the linear decline of 0.028" to point B is seen as straight line 51. The rise from B to C, curve 52 intersects a 0.030" magnetic overlap at level E which is 7 seconds in time beyond point B. Curve 53 shows the return from tip C to central reference A on cam 21.

The simple single control system of FIGURE 1 has a local 60 cycle source applied at 24 volts to input leads 54, 55. Leads 54, 55 connect respectively to binding posts 57, 58. Motor leads 60, 61 connect to binding posts 57, 58 and in turn to the A.C. source to operate the motor 18. The circuit to the gas valve 16 is completed upon contacts 36, 37 engaging: through plate 23, spring 27, lead 62, post 63, lead 64, post 59, and input lead 56 to valve 16; and on through connection 65 through the A.C. source, lead 54, post 57, lead 41, center post 40 to thermal member 35 back to contact 37. Thus when contacts 36, 37 connect due to proper displacement of cam follower 22, or of tip 33, or both, the common A.C. source is placed in direct circuit with the electromagnetic gas valve 16, to energize it. Energization of valve 16 results in gas firing of the heating system.

The setting of pinion 46 and gear sector 42 through pointer 49 is in accordance with predetermined scale numerals that positions member 35 so its contact 37 is just out of engagement with contact 36 at the latter's closest cyclic approach thereto (to the left, FIGURE 1), for the indicated ambient temperatures (e.g. of the room). The magnetic assembly 30 is adjusted to effect snap-on-off action of contacts 36, 37. The operation of the thermostat 15 control may be understood as follows. Assume that the room temperature is 60° F. and that the knob 48 is set for 70° F. With the room temperature at 60° F. the thermal arm 34 is moved to the right with contact 37 closed against 36 for the full cycle of cam 21 rotation. The gas valve 16 is thereupon opened to fire the furnace continuously.

This continuous firing through open gas valve 16 obtains until the room temperature reaches 68° (or 69° if so designed). Thereupon the cam follower in its cyclic motivation by cam 21 opens and closes contacts 36, 37 in accordance with the heat demand requisite to keep the room at its preset 70° F. An equilibrium is reached in the on-off firing of gas valve 16 in a manner similar to the functioning of the system of the aforesaid Patent 2,571,822 in such on-off system.

FIGURE 6 diagrams a more comprehensive control system, utilizing a modified form of my control thermostat. Thermostat 75 is basically the same as thermostat 15 of FIGURE 1 with the addition of a stationary back contact 76. Back contact 76 coacts with rear contact on thermal arm 34, electrically common with contact 37. Contact 76 is adjustably preset by threaded engagement with an aluminum arm 78 extending from a post 79 fixed to base 17. A magnetic snap action assembly 80, similar to assembly 30 is threaded into arm 78 for coaction with thermal member end 33. A small resistor 81 is connected between post 79 and binding post 58, being connected in circuit with the motor energizing source when contacts 76, 37 engage. A two ohm one-half watt resistor is satisfactory, being located near bimetallic strip 35 to substitute for the heat normally available from the operation of motor 18, as will be set forth.

When my cycling thermostat is used singly as in FIGURE 1 to control a forced air heating system, the fan must operate continuously during the general period of heat requirement. It is desirable to automatically shut down the fan when the room temperature rises above the set figure by approximately 1° F. It naturally is essential that any time the thermostat calls for heat when the fan is shut down, the fan shall start again and continuously operate until a general period of no heat requirement is again indicated by a rise of room temperature above the set figure.

The control system shown in FIGURE 6 accomplishes such operation, utilizing the thermostat 75, and relays 85 and 90. Relay 85 has two sets of normally closed contacts 86, 87 with A.C. solenoid 88. Relay 85 has normal A.C. magnet characteristics; for 24 volts 60 cycles applied, its inrush current being 1.5 amperes with 0.5 ampere closed. Solenoid 88 is in series with the 24 volt 60 cycle lead 55. Under normal operating conditions, with timing motor 18 energized, solenoid 88 is also energized and contact sets 86, 87 are open, i.e. unconnected. Timing motor 18 draws low power, e.g. 3 volt-amperes, so relay solenoid 88 is unaffected.

When, because of rising outdoor temperature, the thermostat 35 stops calling for heat, this results in contact 77 moving toward contact 76. When these contacts touch, the timing motor 18 is substantially shortcircuited, the circuit across the 24 volt source being only resistor 81 and the coil 88 of relay 85. Resistor 81 is rated at about ½ watt, 2 ohms as stated above, to provide a slight bit of heat for the bimetallic strip 35 to substitute for the heat normally available from timing motor 18. Resistor 81 therefore has no effect on the pick-up of relay 85.

Fan 91 is a twospeed unit with a common terminal "C," and low "L" and high "H" speed connections. Leads 92, 93 from the 115 volt 60 cycle power source energize fan 91 through relay contacts 86, lead 94 and two-way switch 95. Connection 96 from switch 95 is made to the "L" fan terminal; connection 97, to the "H" terminal. When relay 85 picks up, contact 86 open, shutting down the fan motor 91. As a precautionary measure contacts 87 are in series with the gas valve 16, so that it cannot possibly be "on" when the fan motor 91 is not running.

Essentially the control system of FIGURE 6 without relay 90 as hereinabove described, is for a straight on-off control of the fan motor 91, operating at a single speed. Utilization of the relay 90, as will now be described provides selective control for the two speeds of fan 91. For maximum comfort, it is desirable that, in mild weather, the amount of air forced out of registers be reduced. This is accomplished in a simple manner, without any outdoor relays, by means of the special thermal relay 90 used in conjunction with my thermostat.

Thermal relay 90 comprises a metal block 100 with a transverse base 101 having a central hole 102. A resistor 103 is inserted in hole 102, and is connected in parallel across gas valve 16 by leads 104, 105. Neglecting slight cyclic temperature changes, it is evident that the temperature rise of metal block 31 will be about proportional to the percentage heat requirement of the house. The thermal storage of the block 31 is sufficient to keep the cyclic temperature changes so small that they do not enter into the relay operation. A U-shaped bi-metallic strip 106 surrounds the vertical body of block 100. One end 107 of thermal strip 106 is fastened to block 100; the other end 108 kept free. When a predetermined temperature is reached by block 100 and strip 106, the free end 108 thereof moves to the right against pin 110 of microswitch 95. This action motivates armature 111 of switch 95 to connect to lead 97 and the high speed terminal "H" of fan 91. In this manner the selective high or low speed operation of fan 91 is effected for comfortable heating operation.

When my thermal control systems, either that of FIGURE 1 or FIGURE 6, are used for "Forced Hot Water, Single Control" types of heating, they afford superior control over conventional control systems. A timing cycle for motor 18 of eight or ten minutes is preferred in such applications. The prior large cyclic temperature variations in such forced hot water systems either for gas or oil firing are eliminated with my controls herein. Where zone control is used, a pump and a control thermostat hereof is used for each zone.

*Air Register Control*

In "Forced Hot Air Systems, With Zone Control" there are a number of registers throughout the building individually controlling the rate of flow of hot air therethrough. The furnace or heater operates with any fuel, maintaining a hood temperature of the outgoing air at a predetermined figure, such as 170° F. Such systems are conventional and not detailed herein. One or more registers controlled by a single thermostat constitute a zone. Independently controlled zones may operate from one central hot air source. The thermostatic control for each zone may advantageously be by the invention thermostat 15 used in FIGURE 1, shown in FIGURE 6 as 15a.

Figure 8:
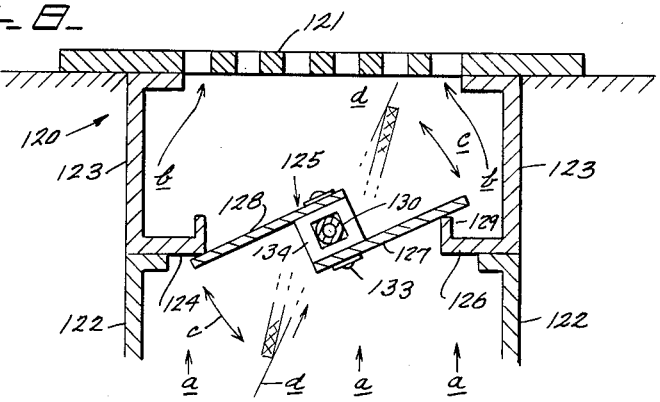
FIGURE 8 is a transverse cross-sectional view through the valve portion of the register of FIGURE 7.
Figure 9:
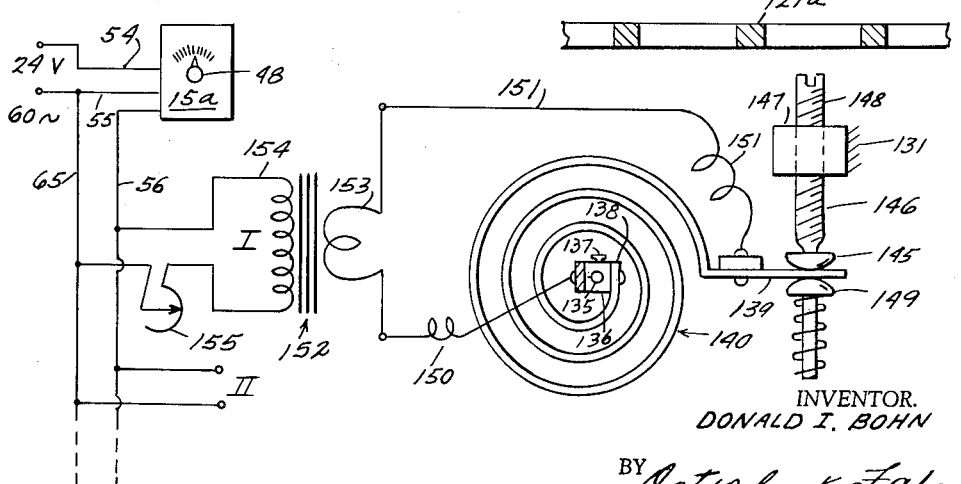
FIGURE 9 is a schematic electrical diagram of a heating system with the control section of the register of FIGURE 7.

A novel, simple, effective and efficient register therefor, is illustrated in FIGURES 7, 8 and 9. Register 120 is essentially a rectangular body with a grille 121 for directing variable amounts of the heated air into the room. The hot air is conducted to each register 120 from the central heating system, through enclosed conduits partially indicated at 122. The air flow a, a, passed through the butterfly valve with a vane 125, at a rate controlled by the degree of its opening, into the body of register 120, the air flow thereupon passes into the room through grille 121, as indicated at b, b in FIGURE 8. The register 120 comprises longitudinal sides 123, 123 with projecting edges 124, 126 coacting with blades 127, 128 of vane 125 blade 127 abuts lip 129 of edge 126, when in the closed position; blade 128, with edge 124, as shown in FIGURE 8. When opened, vane 125 is rotated by an axial shaft 130 along arc c, c, to for example position d, d at 127', 128'. Shaft 130 is preferably of strong light weight material, as an aluminum tube. A small steel journal is provided at each end of shaft 130 supported in ends 131, 132 of the register. The blades 127, 128 are suitably fastened to axial block 134 by bolts 133 to form a lightweight vane assembly 125. An exemplary register 120 used a 19½" long vane assembly 125.

The journal 135 at panel 131 extends through to an end control compartment. A metal hub 136 is secured to journal 135 by set-screw 137 (FIGURE 9). A spiral bi-metallic thermal element 140 has its interior end 138 attached to hub 136. The outer end of element 140 constitutes an arm 141 adjustably positioned with respect to register as will be described herein. The end control compartment is formed by ends 131, 141, and sides 142, 143 secured together by stay-bolts 144, 144. An extension 121a of grille 121 overlays control element 140 and its associated mechanism in the end compartment, exposing same to room temperature. The hot air flow is isolated from this control compartment.

The thermal control element 140, being secured at end 138 to hub 136 effects direct and positive rotary actuation of the butterfly valve vane 125, through shaft 130 at journal 135. Such control action will be set forth hereinafter. An exemplary thermal element 140 for the register 120 consisted of a three ring spirally wound bi-metallic thermal metal strip, 0.040" thick, ¾" wide, and a total of 16" long. The arm 139 of element 135 is actuated by tip 145 of an adjusting screw 146. The body of adjusting screw 146 is threaded in a block 147 mounted on side 131. The slotted top 148 of adjusting screw 146 is accessible from above grille extension 121a for angularly presetting thermal element 140, and correspondingly vane 125 for the null or non-operating condition thereof, namely for zero hot air flow. Element arm 139 is biased against a spring pressed pin 149.

The angular displacement of vane 125 by element 140 is effected by controlled periodic electrical heating of element 140 in accordance with the requisite heat demand of the zone or room as determined by a control thermostat (15a). FIGURE 9 is a schematic diagram of an exemplary arrangement therefor. Suitable power is conducted into thermal strip 140 through flexible cables 150, 151, respectively conductively secured to element ends 138, 139. A small step-down power transformer 152, located in the control compartment with element 140 is used to supply low-voltage high-current energy through element 140. The secondary winding 153 connects to cables 150, 151 to complete the circuit through element 140. The secondary 153 is rated at 0.67 volt to provide a maximum of 23 amperes through the exemplary element 140, when energized. The primary winding 154 is rated at 24 volts, being controllably connected to the 24 volt 60 cycle source through control thermostat 15. An adjustable rheostat 155 is used in series with primary 154 to lower the maximum current applied to element 140 to effect a heat balance between several registers (120) that may be operated off one zone thermostat (15a).

Control thermostat 15a is similar in construction and circuitry as unit 15 of FIGURE 1, except that the timing motor (18) is proportioned to cycle once each 1.5 or 2 minutes for this zone type of control system. With such cycle, tests show that the cyclic swing of the vane 125 is only about 4° of rotation, which is practical and satisfactorily low. The thermal strip 140 is sufficiently stiff so that only the order of 1° rotational variation occurs between heating and cooling due to friction. The exemplary bi-metallic element 140 consists of a spiral bi-metallic thermal strip, thickness .040", width ¾", length 16".

A specific bimetallic thermal strip material found satisfactory for spiral unit 140 is sold commercially under the trademark "Morflex" by the H. A. Wilson Company. This material has a resistance of 530 ohms per sq. mil foot. A spiral unit 140 of the exemplary dimensions hereof has a resistance of .0235 ohm, and a maximum heat dissipation in the circuit of 13.5 watts, other equivalent bimetallic material may be used therefor.

In the exemplary register, the element 140 effected a displacement of vane 125, to open along c—c to a position d—d of 53° opening with 18 amperes applied to element 140 through rheostat 155. This is about 10 watts of heating energy. Greater current would effect a somewhat larger opening displacement. The heating of element 140 and its angular displacement of vane 125 is satisfactorily rapid for the control purposes hereof. The butterfly valve register 120 is sufficiently well balanced pneumatically that there is no appreciable rotation of vane 125 from the air pressure and flow of the hot air. The isolation of the end control compartment, and its communication with the room temperature through grille extension 121a, makes the control action unaffected by the main duct hot air.

The zone control thermostat 15a is energized by the 60 cycle source at 24 volts through leads 54, 55. It is at the ambient zone or room temperature, preset as desired, as described in connection with FIGURE 1. In place of its control connection to the gas valve (16), its output control leads 56, 65, extend to one (I) or several (II, etc.) register controls in parallel. The heat balance desired for the common zone, among the registers is effected through individual rheostats (155) as aforesaid. Upon cyclic demand of heat to the zone of control thermostat 15a completes the circuit between the local 24 volt 60 cycle source through leads 55, 56, 65 and its internal contacts (see 36, 37 of FIGURE 1).

Where a single control thermostat system, per FIGURE 1 with unit 15, is used for forced hot air with oil burner, short "on" periods e.g. of less than one minute are undesirable. The zone register control system of FIGURE 9 is practical in such cases where all registers (120) are operated from a single control thermostat (15a). I have found that very satisfactory modulated heat control results, with the oil burner "on" periods (controlled by a hood thermostat), never below 2 or 3 minutes minimum, which is considered necessary for efficient oil burner operation.

The basic principles of my thermostat controls and systems hereof may be used to improve the control of various forms of air conditioning. With the provision of a thermal flywheel to make extremely short "on" periods of a motor driven compressor unnecessary, the herein controls utilized as set forth would eliminate the discomforting cyclic swings that accompany conventional thermostat control of the compressor.

Although I have set forth several exemplary embodiments of my invention temperature controls, it is to be understood that modifications may be made in the units and systems thereof, and their applications without departing from the broader spirit and scope of the present invention, as set forth in the following claims.

I claim:

1. A control thermostat of the character described comprising a timing motor, a cam driven thereby, a flexible member of non-magnetic material cyclically displaced by said cam having a first contact, and a non-magnetic screw containing a permanent magnet, bimetallic thermal element with an arm with a second contact engageable with said first contact, a magnetic member mounted on said bimetallic element for cooperating with said first magnet, circuit means for closing an external control circuit within cyclic actuations upon the engagement of said contacts, and mechanism for adjusting the position of said arm and second contact with respect to said member and first contact whereby presettable temperature control action is established for the thermostat.

2. A control thermostat as claimed in claim 1, further including a source of alternating current power, motor input leads connecting said motor to said source of power, a pair of terminals connected with said motor input leads for connection to a power source of alternating current, and a third terminal connected to one of said contacts, the other contact being connected to one of the said paired terminals, whereby connection of the external control circuit between said one and third terminals actuates the control circuit by the source when said contacts are engaged.

3. A control thermostat as claimed in claim 1, in which said mechanism comprises a sector gear and a pinion engaged with the gear portion of said sector gear for establishing the presetting action of the thermostat.

4. A control thermostat as claimed in claim 1 a third contact arranged fixedly in the thermostat on the side of said arm opposite that facing said member to establish electrical connection with said arm at periods of no heat demand when said first and second contacts are separated and a resistor adjacent said element and in series with said third contact connected to the other of said paired terminals for effecting actuation of a second external control during sustained periods of no heat demand.

References Cited in the file of this patent

UNITED STATES PATENTS

| | | |
|---|---|---|
| 281,884 | Johnson | July 24, 1883 |
| 1,460,853 | Lacke | July 3, 1923 |
| 2,244,349 | Rickmeyer | June 3, 1941 |
| 2,258,457 | Kimball | Oct. 7, 1941 |
| 2,279,544 | White | Apr. 14, 1942 |
| 2,348,497 | Ray | May 9, 1944 |
| 2,353,740 | Malone | July 18, 1944 |
| 2,416,261 | Kemper | Feb. 18, 1947 |
| 2,464,476 | Armstrong et al. | Mar. 15, 1949 |
| 2,473,789 | Crise | June 21, 1949 |
| 2,491,690 | Ray | Dec. 20, 1949 |
| 2,571,822 | Bohn | Oct. 16, 1951 |
| 2,662,550 | Meyer | Dec. 15, 1953 |